United States Patent
Ozawa

(10) Patent No.: US 8,525,928 B2
(45) Date of Patent: Sep. 3, 2013

(54) SIGNAL TRANSMISSION SYSTEM

(75) Inventor: Masato Ozawa, Shinagawa (JP)

(73) Assignee: Fujitsu Component Limited, Tokyo (JP)

( * ) Notice: Subject to any disclaimer, the term of this patent is extended or adjusted under 35 U.S.C. 154(b) by 325 days.

(21) Appl. No.: 12/805,605

(22) Filed: Aug. 9, 2010

(65) Prior Publication Data

US 2011/0043690 A1 Feb. 24, 2011

(30) Foreign Application Priority Data

Aug. 20, 2009 (JP) ................................ 2009-190905

(51) Int. Cl.
*H04N 7/04* (2006.01)

(52) U.S. Cl.
USPC ........................... 348/495; 348/496; 348/500

(58) Field of Classification Search
None
See application file for complete search history.

(56) References Cited

U.S. PATENT DOCUMENTS

| | | | | |
|---|---|---|---|---|
| 5,268,676 A * | 12/1993 | Asprey et al. | ................. | 345/169 |
| 5,926,172 A * | 7/1999 | Hanley | ........................... | 345/210 |
| 6,160,543 A * | 12/2000 | Chen | ............................. | 345/213 |
| 6,212,584 B1 * | 4/2001 | Nei | ................................ | 710/72 |
| 6,385,666 B1 * | 5/2002 | Thornton et al. | ................. | 710/2 |
| 6,618,774 B1 * | 9/2003 | Dickens et al. | ................. | 710/64 |
| 2004/0252239 A1 * | 12/2004 | Niiyama | ....................... | 348/561 |
| 2007/0284949 A1 * | 12/2007 | Voll et al. | ...................... | 307/147 |
| 2008/0060050 A1 * | 3/2008 | Briano et al. | ................. | 725/149 |
| 2008/0068501 A1 * | 3/2008 | Hall | ............................. | 348/496 |
| 2009/0043928 A1 * | 2/2009 | Lou | .................................. | 710/61 |
| 2009/0128696 A1 * | 5/2009 | Ideura et al. | ................. | 348/500 |
| 2010/0124470 A1 * | 5/2010 | Yeh et al. | ................. | 375/240.01 |
| 2010/0238297 A1 * | 9/2010 | Gou et al. | ................. | 348/181 |
| 2011/0057881 A1 * | 3/2011 | Wen et al. | ..................... | 345/163 |

FOREIGN PATENT DOCUMENTS

JP 2004-356939 12/2004

* cited by examiner

*Primary Examiner* — Jefferey Harold
*Assistant Examiner* — Humam Satti
(74) *Attorney, Agent, or Firm* — Staas & Halsey LLP

(57) ABSTRACT

A signal transmission system includes a transmission apparatus and a reception apparatus, the transmission apparatus including: a first portion that converts a video signal into differential signals, converts a vertical synchronization signal into a common mode signal, and transmits the converted signals to the reception apparatus via three pairs of signal lines; and a second portion that converts a horizontal synchronization signal into differential signals, converts a first console signal into a common mode signal, transmits the converted signals to the reception apparatus via a single pair of signal lines; the reception apparatus including: a third portion that restores the differential signals to the video signal, and restores the common mode signal to the vertical synchronization signal; and a fourth portion that restores the differential signals to the horizontal synchronization signal, and restores the common mode signal to the first console signal.

6 Claims, 6 Drawing Sheets

SIGNAL TRANSMISSION SYSTEM

CROSS-REFERENCE TO RELATED APPLICATION

This application is based upon and claims the benefit of priority of the prior Japanese Patent Application No. 2009-190905, filed on Aug. 20, 2009, the entire contents of which are incorporated herein by reference.

FIELD

A certain aspect of the embodiments discussed herein is related to a signal transmission system.

BACKGROUND

Conventionally, there has been known a remote system in which a reception apparatus is connected to a transmission apparatus via a category 5 (CAT-5) cable, i.e., a LAN cable (see Japanese Laid-Open Patent Application Publication No. 2004-356939).

The transmission apparatus transmits a video signal to the reception apparatus with three pairs of signal lines in the CAT-5 cable, and transmits and receives a console signal such as a keyboard/mouse signal to/from the reception apparatus with remaining single pair of signal lines in the CAT-5 cable. Analog RGB (Red-Green-Blue) signals, a horizontal synchronization signal and a vertical synchronization signal are included in the video signal. The analog RGB signals are converted into differential signals, and the differential signals are transmitted to the reception apparatus. The horizontal synchronization signal and the vertical synchronization signal are transmitted to the reception apparatus as common mode signals.

However, in the technique of Japanese Laid-Open Patent Application Publication No. 2004-356939, the horizontal synchronization signal is transmitted to the reception apparatus as the common mode signal, and hence the horizontal synchronization signal is liable to receive the influences of a common mode noise and a static electricity noise, and so on. Especially, since the pulse width of the horizontal synchronization signal becomes narrow as a monitor has a higher resolution, the horizontal synchronization signal is liable to receive the influences.

In a shielded Cat 5 cable, the blunting of a waveform of the common mode signal becomes large, and hence it is difficult for the reception apparatus to reproduce the horizontal synchronization signal. Accordingly, a trouble occurs. For example, a blackout (i.e., a phenomenon in which a screen becomes a solid black) occurs on the screen of the monitor, or shaking and distortion of the video displayed on the screen occurs.

SUMMARY

According to an aspect of the present invention, there is provided a signal transmission system including a transmission apparatus and a reception apparatus comprising: the transmission apparatus including: a first portion that converts a video signal into differential signals, converts a vertical synchronization signal into a common mode signal, and transmits the converted differential signals and the converted common mode signal to the reception apparatus via three pairs of signal lines in a network cable; and a second portion that converts a horizontal synchronization signal into differential signals, converts a first console signal into a common mode signal, transmits the converted differential signals and the converted common mode signal to the reception apparatus via a single pair of signal lines in the network cable, and receives a second console signal which has been converted into a common mode signal, from the reception apparatus via the single pair of signal lines in the network cable; and the reception apparatus including: a third portion that receives the converted differential signals and the converted common mode signal from the first portion via the three pairs of signal lines, restores the received differential signals to the video signal, and restores the received common mode signal to the vertical synchronization signal; and a fourth portion that receives the converted differential signals and the converted common mode signal from the second portion via the single pair of signal lines, restores the received differential signals to the horizontal synchronization signal, restores the received common mode signal to the first console signal, converts the second console signal into a common mode signal, and transmits the converted common mode signal to the transmission apparatus via the single pair of signal lines.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

A description will now be given of an exemplary embodiment with reference to the accompanying drawings.

Figure 1:
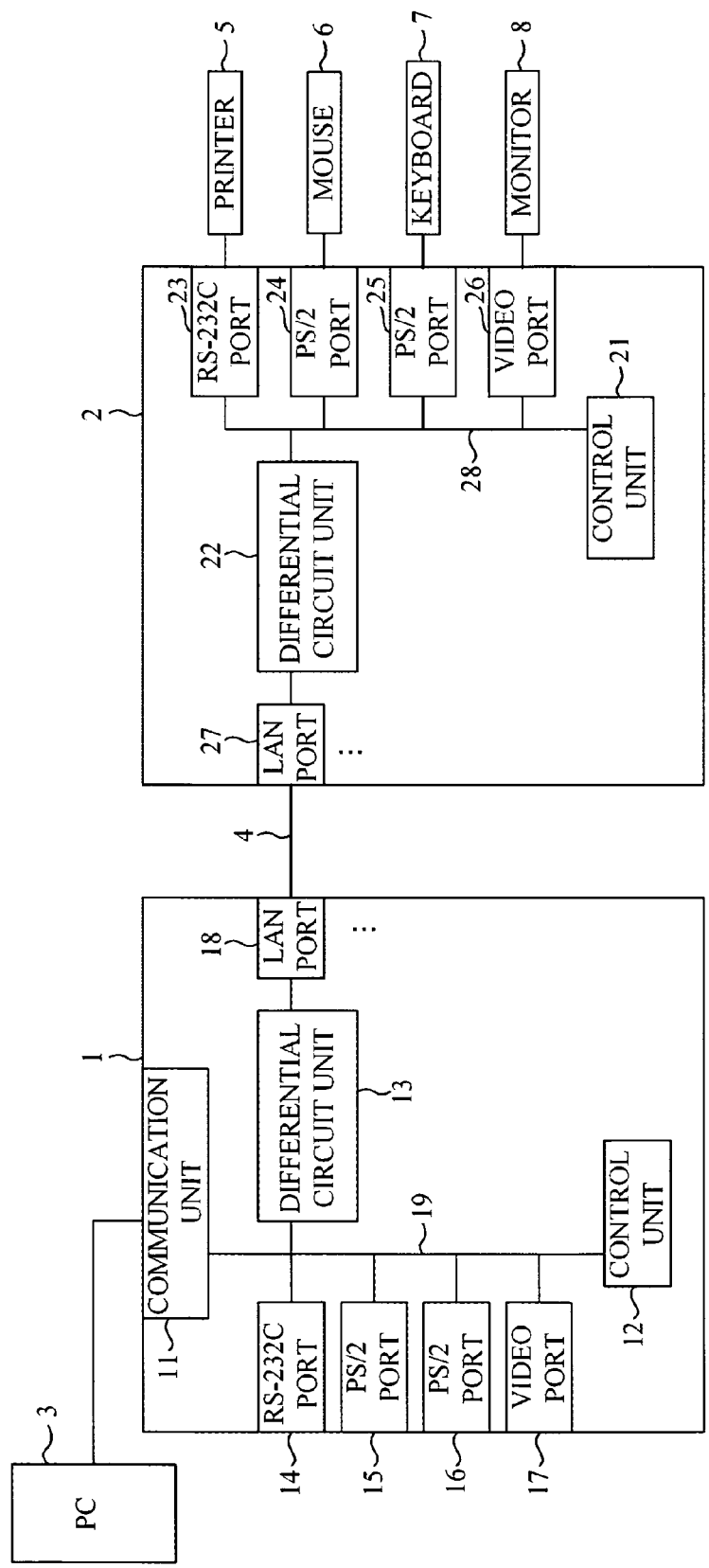
FIG. 1 illustrates an exemplary schematic construction of a signal transmission system according to an exemplary embodiment.

FIG. 1 illustrates an exemplary schematic construction of a signal transmission system according to an exemplary embodiment.

As illustrated in FIG. 1, the signal transmission system includes a transmission apparatus 1, a reception apparatus 2, a computer (hereinafter referred to as "PC") 3, a category 5 (CAT-5) cable 4 as a network cable, a printer 5, a mouse 6, a keyboard 7, and a monitor 8. The CAT-5 cable 4 is a so-called shielded twisted pair (STP) cable, and includes four pairs of signal lines (i.e., eight signal lines in total).

The transmission apparatus 1 includes: a communication unit 11 that receives a video signal (i.e., RGB signals) from the PC 3; a control unit 12 that controls the entire transmission apparatus 1; a differential circuit unit 13 that outputs the RGB signals and a horizontal synchronization signal as differential signals, outputs a vertical synchronization signal as a common mode signal, and inputs a console signal (i.e., a keyboard signal and a mouse signal) as the common mode signal; an RS-232C port 14 that is connectable to a printer, not shown; a PS/2 port 15 that is connectable to a mouse, not shown; a PS/2 port 16 that is connectable to a keyboard, not shown; a video port 17 that is connectable to a monitor, not shown; and a LAN (Local Area Network) port 18 that is connected to the CAT-5 cable 4. The control unit 12 is connected to the communication unit 11, the differential circuit unit 13, the RS-232C port 14, the PS/2 ports 15 and 16, and the video port 17 via a system bus 19. The differential circuit unit 13 is connected to the LAN port 18. The transmission apparatus 1 may include plural LAN ports. The control unit 12 is composed of a micro processor, a memory, and so on.

The reception apparatus 2 includes: a control unit 21 that controls the entire reception apparatus 2; a differential circuit unit 22 that inputs the RGB signals and the horizontal synchronization signal as the differential signals, inputs the vertical synchronization signal as the common mode signal, and outputs the console signal as the common mode signal; an RS-232C port 23 that is connected to the printer 5; a PS/2 port 24 that is connected to the mouse 6; a PS/2 port 25 that is connected to the keyboard 7; a video port 26 that is connected to a monitor 8; and a LAN port 27 that is connected to the CAT-5 cable 4. The control unit 21 is connected to the differential circuit unit 22, the RS-232C port 23, the PS/2 ports 24 and 25, the video port 26 via a system bus 28. The differential circuit unit 22 is connected to the LAN port 27. The transmission apparatus 1 may include plural LAN ports. The control unit 21 is composed of a micro processor, a memory, and so on.

The PC 3 transmits the RGB signals including a red signal, a green signal, a blue signal, the vertical synchronization signal (Vsync), and the horizontal synchronization signal (Hsync) to the transmission apparatus 1.

Figure 2:
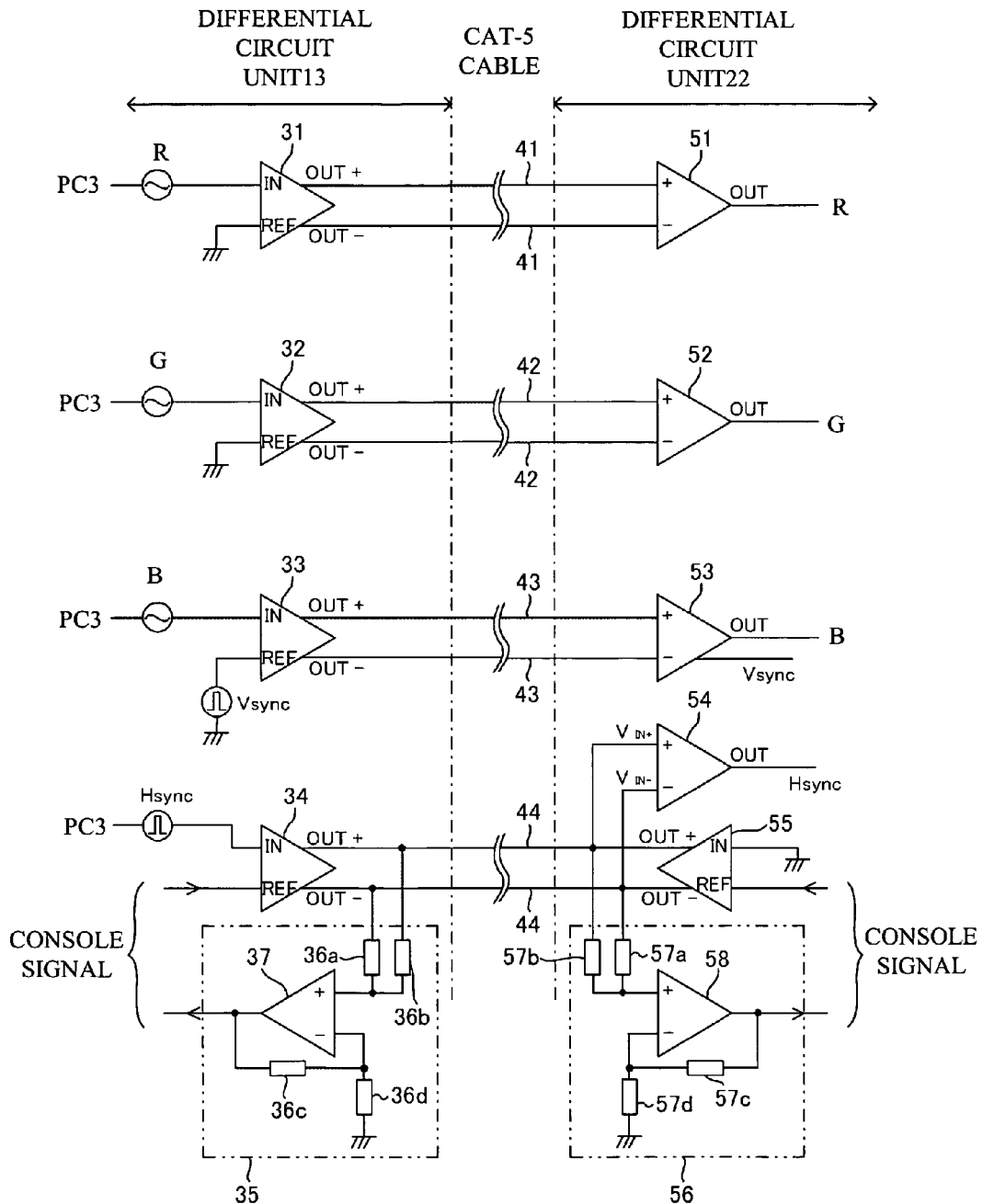
FIG. 2 illustrates an exemplary construction of a differential circuit unit 13 in a transmission apparatus 1 and a differential circuit unit 22 in a reception apparatus 2.

FIG. 2 illustrates an exemplary construction of a differential circuit unit 13 in a transmission apparatus 1 and a differential circuit unit 22 in a reception apparatus 2.

The differential circuit unit 13 of the transmission apparatus 1 includes differential drivers 31 to 34, and a console signal receiving circuit 35. The differential circuit unit 22 of the reception apparatus 2 includes differential receivers 51 to 54, a differential driver 55, and a console signal receiving circuit 56.

The differential driver 31 inputs the red signal from the PC 3 to an "IN" port, and converts the red signal into differential signals. The converted differential signals are transmitted to the differential receiver 51 via one pair of signal lines 41 in the CAT-5 cable 4. The differential receiver 51 receives the converted differential signals, restores the converted differential signals to the original red signal, and outputs the red signal to the monitor 8.

The differential driver 32 inputs the green signal from the PC 3 to an "IN" port, and converts the green signal into differential signals. The converted differential signals are transmitted to the differential receiver 52 via one pair of signal lines 42 in the CAT-5 cable 4. The differential receiver 52 receives the converted differential signals, restores the converted differential signals to the original green signal, and outputs the green signal to the monitor 8.

The differential driver 33 inputs the blue signal from the PC 3 to an "IN" port, and converts the blue signal into differential signals. The differential driver 33 inputs the vertical synchronization signal from the PC 3 to an "REF" port, and converts the vertical synchronization signal into the common mode signal. Further, the differential driver 33 superimposes the converted common mode signal on the converted differential signals, and transmits the superimposed signals to the differential receiver 53 via one pair of signal lines 43 in the CAT-5 cable 4. The differential receiver 53 receives the superimposed signals, and separates the superimposed signals into the differential signals and the common mode signal. Further, the differential receiver 53 restores the differential signals to the original blue signal, restores the common mode signal to the original vertical synchronization signal, and outputs the blue signal and the vertical synchronization signal to the monitor 8.

The differential driver 34 inputs the horizontal synchronization signal from the PC 3 to an "IN" port, and converts the horizontal synchronization signal into differential signals. The differential driver 34 converts the console signal input from the PS/2 port 15 or 16 into common mode signals. Further, the differential driver 34 superimposes the converted common mode signals on the converted differential signals, and transmits the superimposed signals to the reception apparatus 2 via one pair of signal lines 44 in the CAT-5 cable 4.

The console signal receiving circuit 35 receives the console signal as the common mode signals from the reception apparatus 2 via one pair of signal lines 44. The console signal receiving circuit 35 includes resistances 36a to 36d having respective 1 k ohm (i.e., 1000 ohm), and an operational amplifier 37. The console signal from the reception apparatus 2 is input to a "+" port of the operational amplifier 37 via the resistances 36a and 36b as terminating resistances, and are amplified. The amplified signal is output to the control unit 12 or the PC 3.

The differential receiver 54 receives the superimposed signals from the differential driver 34, and separates the superimposed signals into the differential signals and the common mode signals. The differential receiver 54 restores the differential signals to the original horizontal synchronization signal, and outputs the original horizontal synchronization signal to the monitor 8. The differential driver 55 inputs the console signal from the mouse 6 or the keyboard 7 to a "REF" port, and converts the console signal into the common mode signals. The converted common mode signals are transmitted to the console signal receiving circuit 35 via one pair of signal lines 44 in the CAT-5 cable 4.

The console signal receiving circuit 56 receives the superimposed signals from the differential driver 34, and separates the superimposed signals into the differential signals and the common mode signals. The console signal receiving circuit 56 restores the common mode signals to the original console signal, and outputs the original console signal to the control unit 21. The console signal receiving circuit 56 includes resistances 57a to 57d having respective 1 k ohm, and an operational amplifier 58. The console signal from the transmission apparatus 1 is input to a "+" port of the operational amplifier 58 via the resistances 57a and 57b as terminating resistances, and are amplified. The amplified signal is output to the control unit 21.

Figure 3:
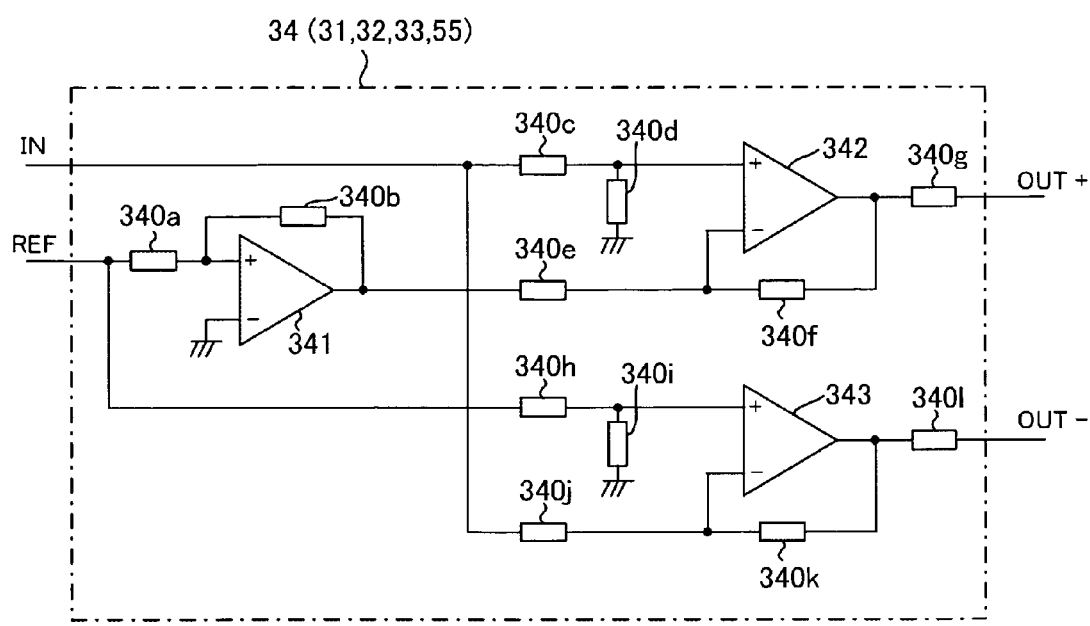
FIG. 3 is a circuit diagram of a differential driver 34.

FIG. 3 is a circuit diagram of the differential driver 34. Here, the circuitry of the differential drivers 31 to 33 and 55 is the same as that of the differential driver 34, and hence a description thereof is omitted.

Figure 4:
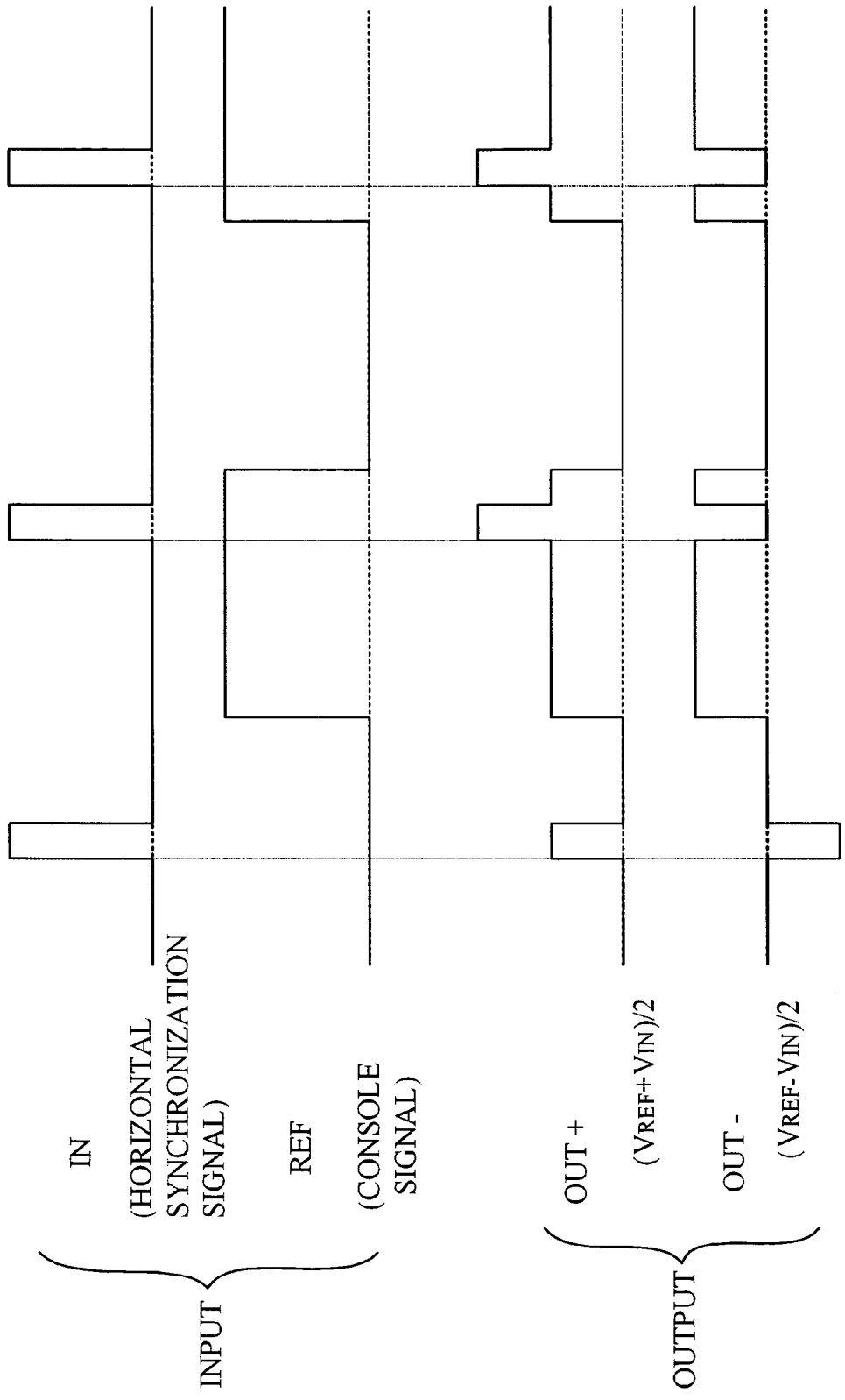
FIG. 4 is a diagram showing waveforms of input signals and output signals of the differential driver 34.

The differential driver 34 includes three operational amplifiers 341 to 343, and resistances 340a to 340l. Each of the resistances 340a to 340f, and 340h to 340k has 1 k ohm (i.e., 1000 ohm), and each of the resistances 340g and 340l has 50 ohm. As illustrated in FIG. 4, the horizontal synchronization signal is input to the "IN" port of the differential driver 34, and the console signal is input to the "REF" port of the differential driver 34.

Then, as illustrated in FIG. 4, a signal (i.e., (Vref+Vin)/2) having a half level of the superimposed signal in which the horizontal synchronization signal is superimposed on the console signal is output from an "OUT+" port of the differential driver 34. This is because the superimposed signal in which the horizontal synchronization signal is superimposed on the console signal is divided with the resistance 340g. Also, as illustrated in FIG. 4, a signal (i.e., (Vref−Vin)/2) having a half level of a signal in which the horizontal synchronization signal is subtracted from the console signal is output from an "OUT−" port of the differential driver 34. This is because the signal in which the horizontal synchronization signal is subtracted from the console signal is divided with the resistance 340l.

Figure 5:
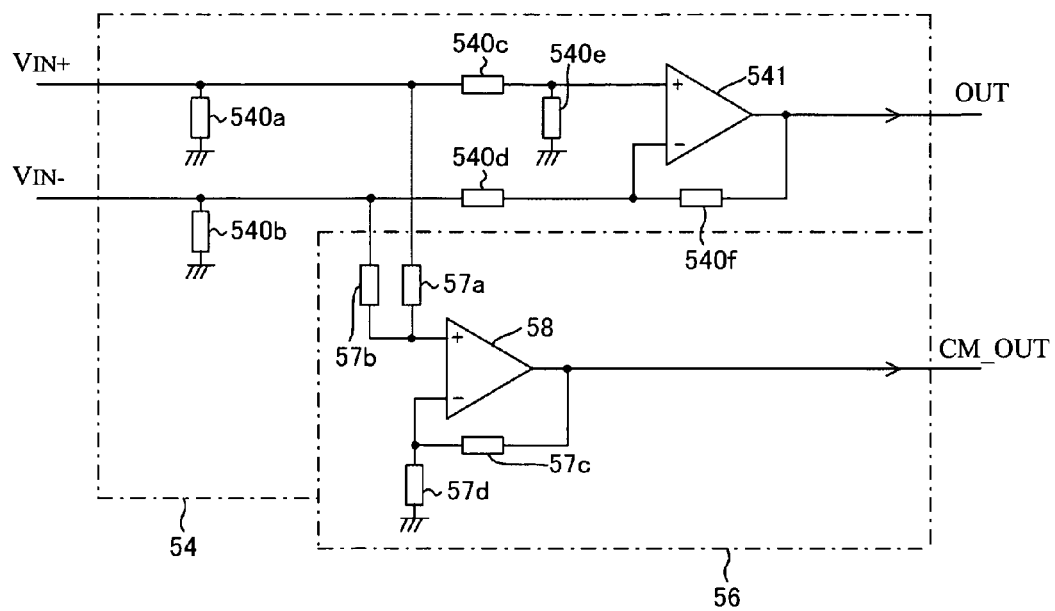
FIG. 5 is a circuit diagram of a differential receiver 54 and a console signal receiving circuit 56.

FIG. 5 is a circuit diagram of the differential receiver 54 and the console signal receiving circuit 56.

It should be noted that the differential receiver 53 has the circuitry of the combination of the differential receiver 54 and the console signal receiving circuit 56. Each of the differential receivers 51 and 52 has the same circuitry as the differential receiver 54.

The differential receiver 54 includes an operational amplifier 541, and resistances 540a to 540f. Each of the resistances 540a and 540b has 50 ohm, and each of the resistances 540c to 540f has 1 k ohm.

Figure 6:
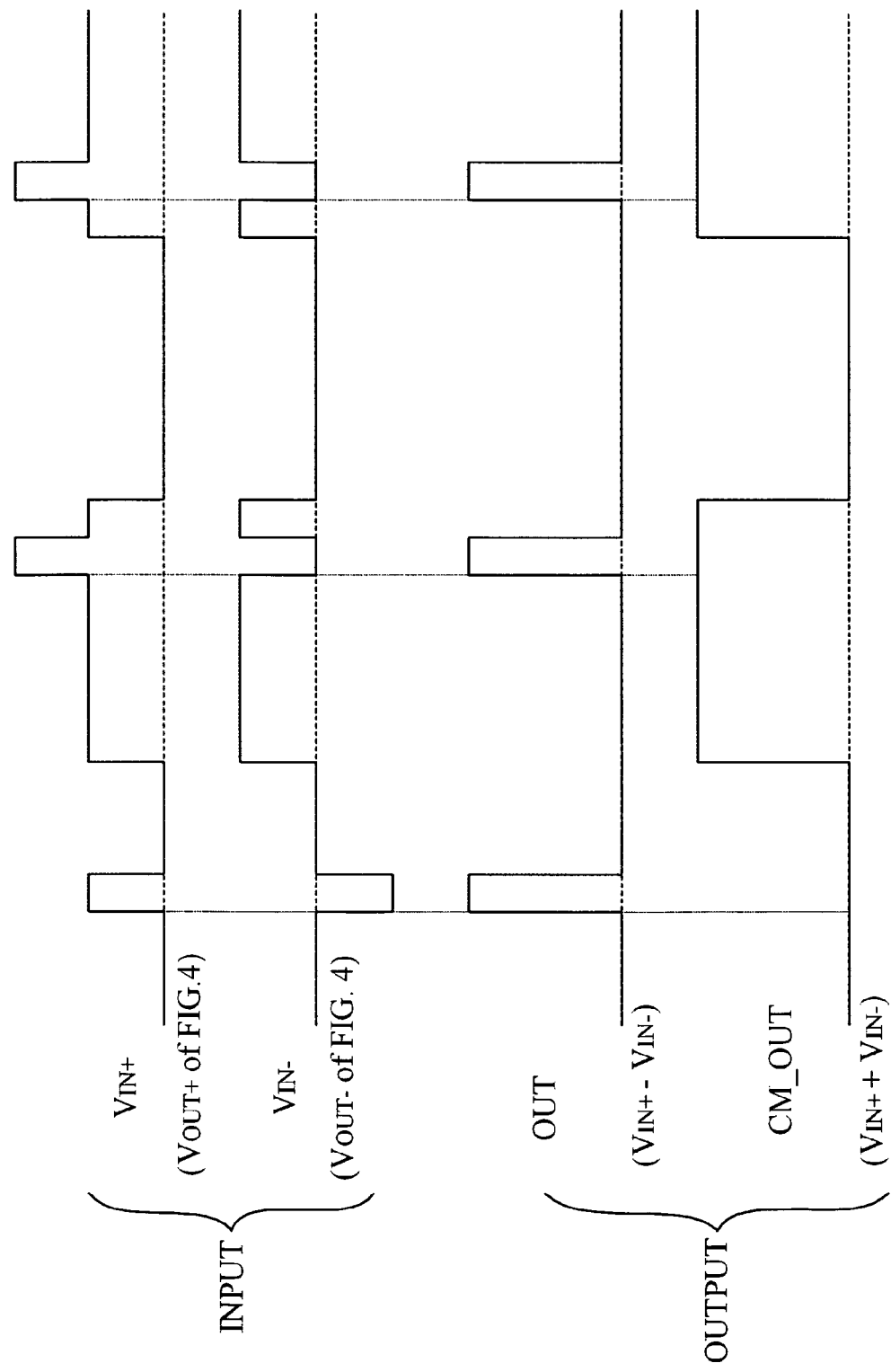
FIG. 6 is a diagram showing waveforms of input signals and output signals of the differential receiver 54 and an operational amplifier 58.

As illustrated in FIG. 6, the signal (i.e., (Vref+Vin)/2) from the "OUT+" port of the differential driver 34 is input to "Vin+" of the differential receiver 54, and the signal (i.e., (Vref−Vin)/2) from the "OUT−" port of the differential driver 34 is input to "Vin−" of the differential receiver 54.

Then, the operational amplifier 541 subtracts the signal (i.e., (Vref−Vin)/2) from the "OUT−" port of the differential driver 34, from the signal (i.e., (Vref+Vin)/2) from the "OUT+" port of the differential driver 34 (i.e., "Vin+"−"Vin−") to restore the horizontal synchronization signal to its original state. Hereby, as illustrated in FIG. 6, the horizontal synchronization signal is output from the "OUT" port of the differential receiver 54.

Moreover, the signal (i.e., (Vref+Vin)/2) from the "OUT+" port of the differential driver 34 and the signal (i.e., (Vref−Vin)/2) from the "OUT−" port of the differential driver 34 are input to the "+" port of the operational amplifier 58. The operational amplifier 58 adds the signal (i.e., (Vref+Vin)/2) from the "OUT+" port of the differential driver 34 to the signal (i.e., (Vref−Vin)/2) from the "OUT−" port of the differential driver 34 (i.e., "Vin+"+"Vin−") to restore the console signal to its original state. Hereby, as illustrated in FIG. 6, the console signal is output from an output port (i.e., "CM_OUT" port) of the console signal receiving circuit 56.

As described above, according to the signal transmission system of the exemplary embodiment, the horizontal synchronization signal is converted into the differential signals by the differential driver 34, and is less affected by noises. Therefore, the signal transmission system can transmit and reproduce a stable video signal (i.e., stable RGB signals). In addition, a crosstalk to the video signal caused by the console signal can be reduced.

For example, the differential drivers 31 to 33 in FIG. 2 correspond to a first portion, and the differential driver 34 and the console signal receiving circuit 35 in FIG. 2 correspond to a second portion. For example, the differential receivers 51 to 53 in FIG. 2 correspond to a third portion, and the differential receiver 54, the differential driver 55 and the console signal receiving circuit 56 in FIG. 2 correspond to a fourth portion. For example, the differential driver 34 in FIG. 1 corresponds to a first differential driver, and the console signal receiving circuit 35 in FIG. 2 corresponds to a first reception circuit. For example, the differential receiver 54 in FIG. 2 corresponds to a differential receiver, the console signal receiving circuit 56 in FIG. 2 corresponds to a second reception circuit, and the differential driver 55 in FIG. 2 corresponds to a second differential driver. For example, the signal of "OUT+" in FIG. 4 corresponds to a first signal, and the signal of "OUT−" in FIG. 4 corresponds to a second signal.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:

1. A signal transmission system including a transmission apparatus and a reception apparatus comprising:
   the transmission apparatus including:
      a first portion that converts a video signal into differential signals, converts a vertical synchronization signal into a common mode signal, and transmits a signal in which the converted differential signals and the converted common mode signal are superimposed to the reception apparatus via a pair of signal lines in a network cable; and
      a second portion that converts only a horizontal synchronization signal into differential signals, converts a first console signal into a common mode signal, transmits the converted differential signals and the converted common mode signal to the reception apparatus via a single pair of signal lines in the network cable, and receives a second console signal which has been converted into a common mode signal, from the reception apparatus via the single pair of signal lines in the network cable; and
   the reception apparatus including:
      a third portion that receives the superimposed signal from the first portion via the pair of signal lines, restores the differential signals in the received signal to the video signal, and restores the common mode signal in the received signal to the vertical synchronization signal; and
      a fourth portion that receives the signal from the second portion via the single pair of signal lines, restores the differential signals in the received signal to the horizontal synchronization signal, restores the common mode signal in the received signal to the first console signal, converts the second console signal into a common mode signal, and transmits the converted common mode signal to the transmission apparatus via the single pair of signal lines.

2. The signal transmission system according to claim 1, wherein the second portion further including:
   a first differential driver that converts the horizontal synchronization signal into the differential signals, converts the first console signal into the common mode signal, superimposes the differential signals on the common mode signal, and transmits the superimposed signal to the reception apparatus via the single pair of signal lines; and
   a first reception circuit that receives the second console signal which has been converted into the common mode signal, from the reception apparatus via the single pair of signal lines; and the fourth portion further including:
 a differential receiver that separates the superimposed signal from the first differential driver into the differential signals and the common mode signal, and restores the separated differential signals to the horizontal synchronization signal;
 a second reception circuit that separates the superimposed signal from the first differential driver into the differential signals and the common mode signal, and restores the separated common mode signal to the first console signal; and
 a second differential driver that converts the second console signal into the common mode signal, and transmits the converted common mode signal to the transmission apparatus via the single pair of signal lines.

3. The signal transmission system according to claim 2, wherein
 the first differential driver outputs a first signal having a half level of the superimposed signal, and a second signal having a half level of a signal in which the horizontal synchronization signal is subtracted from the first console signal, and
 the differential receiver restores the horizontal synchronization signal to its original state by subtracting the second signal from the first signal, and restores the first console signal to its original state by adding the second signal to the first signal.

4. A transmission apparatus that is capable of transmitting a video signal to a reception apparatus, the transmission apparatus comprising:
 a first driver connected to a first pair of signal lines, that converts only a horizontal synchronization signal into first differential signals, converts a first console signal into a first common mode signal, and superimposes the first differential signals and the first common mode signal, the superimposed signal being transmitted to the reception apparatus via the first pair of signal lines; and
 a second driver connected to a second pair of signal lines, that converts the video signal into second differential signals, converts a vertical synchronization signal into a second common mode signal, and superimposes the second differential signal and the second common mode signal, the superimposed signal from the second driver being transmitted to the reception apparatus through the second pair of signal lines.

5. The transmission apparatus according to claim 4, wherein the second driver includes drivers each connected to the different pair of signal lines, corresponds to one of RGB signals, and converts the corresponding signal into the differential signals, and one of the drivers converts the vertical synchronization signal into a common mode signal, and superimposes the converted common mode signal to the corresponding signal.

6. A reception apparatus that is capable of receiving a video signal from a transmission apparatus, the reception apparatus comprising:
 a receiver that receives signals in which differential signals converted from only a horizontal synchronization signal and common mode signal converted from a first console signal are superimposed and transmitted through a pair of signal lines, restores the horizontal synchronization signal from the differential signal in the received superimposed signal, and restores the first console signal from the common mode signal in the received superimposed signal.

* * * * *